US007746669B2

(12) United States Patent
Falk

(10) Patent No.: US 7,746,669 B2
(45) Date of Patent: Jun. 29, 2010

(54) BIDIRECTIONAL BATTERY POWER INVERTER

(75) Inventor: Andreas Falk, Kassel (DE)

(73) Assignee: SMP Solar Technology AG, Niestetal (DE)

(*) Notice: Subject to any disclaimer, the term of this patent is extended or adjusted under 35 U.S.C. 154(b) by 309 days.

(21) Appl. No.: 11/977,115

(22) Filed: Oct. 23, 2007

(65) Prior Publication Data
US 2008/0094860 A1 Apr. 24, 2008

Related U.S. Application Data

(63) Continuation-in-part of application No. PCT/DE2006/000755, filed on Apr. 29, 2006.

(30) Foreign Application Priority Data
May 20, 2005 (DE) .................. 10 2005 023 290

(51) Int. Cl.
H02M 3/335 (2006.01)
H02M 7/5387 (2007.01)
(52) U.S. Cl. .................. 363/17; 363/21.02; 363/98; 363/132
(58) Field of Classification Search .................. 363/16, 363/17, 21.02, 21.03, 34, 35, 37, 97, 8, 131, 363/132, 98
See application file for complete search history.

(56) References Cited

U.S. PATENT DOCUMENTS

| 5,315,497 | A | * | 5/1994 | Severinsky | ............... 363/34 |
|---|---|---|---|---|---|
| 5,488,554 | A | * | 1/1996 | Green | ............... 363/25 |
| 5,729,444 | A | * | 3/1998 | Perol | ............... 363/25 |
| 6,507,503 | B2 | | 1/2003 | Norrga | |
| 6,657,873 | B2 | * | 12/2003 | Igarashi | ............... 363/17 |
| 6,693,804 | B2 | * | 2/2004 | Suzuki | ............... 363/24 |
| 6,906,933 | B2 | * | 6/2005 | Taimela | ............... 363/37 |
| 7,046,526 | B2 | * | 5/2006 | Toda et al. | ............... 363/24 |

(Continued)

FOREIGN PATENT DOCUMENTS
DE 40 13 506 A1 10/1991

(Continued)

OTHER PUBLICATIONS

Hofsajer I W et al: "A comparative study of some electromagnetically integrated structures in hybrid technology" May 17, 1998, pp. 1957-1963, pp. 1961-1962.

(Continued)

Primary Examiner—Matthew V Nguyen
(74) Attorney, Agent, or Firm—Thomas R. Vigil

(57) ABSTRACT

Disclosed is a bi-directional battery power inverter (1) comprising a DC-DC converter circuit element (3) to which the battery (2) can be connected in order to generate an AC output voltage from a battery (2) voltage in a discharging mode while charging the battery (2) in a charging mode. The inverter (1) further comprises an HF transformer which forms a resonant circuit along with a resonant capacitor (6). In order to increase the efficiency of said battery power inverter, the transformer is provided with two windings (11, 12) with a center tap (20) on the primary side, said center tap (20) being connected to a power electronic center-tap connection with semiconductor switches (21, 31) while a winding (13) to which the resonant capacitor (6) is serially connected provided on the secondary side.

18 Claims, 7 Drawing Sheets

U.S. PATENT DOCUMENTS

2003/0142513 A1     7/2003     Vinciarelli

FOREIGN PATENT DOCUMENTS

| | | |
|---|---|---|
| EP | 0 820 893 A2 | 1/1998 |
| EP | 1 458 084 A2 | 9/2004 |
| WO | WO 96/18937 | 6/1996 |
| WO | WO 2005/036684 A | 4/2005 |

OTHER PUBLICATIONS

Hofsajer I W et al "A new manufacturing and packaging technology for the integration of power electronics" Oct. 8, 1995, pp. 891-897, p. 892, p. 893.

Patent Abstracts of Japan 2003 088118 (Sanken Electric Co Ltd) Jul. 3, 2003.

Enrico Dallago et al "Advances in High-Frequency Power Conversion by Delta-Sigma Modulation" Aug. 8, 1997 ISSN: 1057-7122 p. 714-p. 715, p. 717.

\* cited by examiner

BIDIRECTIONAL BATTERY POWER INVERTER

This application claims Priority from German Application No. DE 10 2005 023 290.6 filed on 20 May 2005

BACKGROUND OF THE INVENTION

1. Field of the Invention

The present invention relates to a bidirectional battery power inverter as set forth in the preamble of claim 1 and claim 2.

2. Description of the Prior Art

Bidirectional power inverters serve on the one side to convert a DC battery voltage from 12 volt into a 50 Hz or 60 Hz AC voltage of e.g., 230 volt, on the other side however also to charge the battery from the AC voltage. The energy flows both from the battery to a DC-AC converter and from the DC-AC converter to the battery. The problem arising here is that the conduction losses are quite high at such small DC voltages.

A power inverter with a half-bridge array on the primary side and a full bridge array on the secondary side is known from the document EP 0 820 893 A2.

A bidirectional DC-DC converter is known from EP 1 458 084 A2. It includes a bridge circuit on the input side, a bridge circuit on the output side and a transformer connected between said two circuits, said transformer having a resonant capacitor and a resonant inductor.

A DC-AC converter having a transformer, which comprises two windings with center tap on the primary side, is connected to a power electronic midpoint circuit with semiconductor switches and comprises a winding on the secondary side, is shown and described in U.S. Pat. No. 6,507,503 B2.

Further converter circuits have been disclosed in the document DE 40 13 506 A1 and in U.S. 2003/0142513 A1.

BRIEF SUMMARY OF THE INVENTION

It is the object of the invention to provide a high efficiency power inverter.

This object is achieved by a power inverter having the characterizing features of claim 1 in connection with the features of the preamble.

The invention allows benefiting from all the advantages of resonant switching without the tradeoff of high conduction losses on the undervoltage side. A high switch frequency can be utilized hereby. As a result, a planar transformer, which is provided in accordance with a preferred embodiment, may be utilized.

The present invention combines the advantages of low conduction losses and the possibility of utilizing a planar transformer without the trade-off of an unfavorable high apparent power of the transformer and switch overvoltages on the primary side, a restricted operating range and high conduction and switch losses on the low voltage side. Put another way, this means that with the topology of the invention, as contrasted to prior art, a very low-loss, fully resonant switching is made possible on the high current side by the fact that the adjustment stage (boost-buck chopper) is activated in operation ranges in which the voltage needs to be adapted.

In accordance with the invention, there is provided that a DC-AC converter circuit element is provided, said converter circuit element lying on the output side of the inverter and comprising a boost-buck chopper that is connected between the DC-DC converter and the DC-AC converter circuit element. As a result, switching losses due to non-optimal operation in which the DC-DC converter cannot be switched resonantly and an unfavorable current/voltage configuration in the optimal point of operation are avoided.

By virtue of the fact that a resonant switching element is distributed in circuit parts with staggered clocking, the capacitor load is low and the HF ripple current in the DC source is low as well.

Appropriately, the clock rate of the half-bridge circuit is less than the resonant frequency that is determined by the transformer leakage inductance and the resonant capacitor, depending on whether there is provided one such capacitor or two capacitors connected in series. The resonant frequency is obtained from the leakage inductance of the transformer and the series resonant capacitance or from the leakage inductance of the transformer and the series connected capacitors. Selecting this clock rate, the semiconductors are switched both on and off with zero current.

If the clock rate of the half-bridge circuit is less than the resonant frequency obtained from the leakage inductance of the transformer and the series resonant capacitance, switching on should always occur at zero current since in this case the switching losses are low or inexistent. In accordance with another advantageous developed implementation of the invention, there is provided a synchronous actuation of the boost-buck chopper and of the resonant converter. The synchronous actuation has the advantage that the effective current load is minimized in the capacitors of the power inverter.

A particular effect of benefit is achieved if the transformer is configured to be a planar transformer, said planar transformer being provided with two printed circuit boards. Both the core of the transformer and the printed circuit boards are housed in a housing. A cast housing is manufacturable at lower cost since projections needed in the cast housing of a planar transformer are easier to manufacture. A planar transformer with two printed circuit boards is moreover manufacturable at a lower cost than a planar transformer having a large printed circuit board. A large printed circuit board is more expensive than two small ones.

Other advantageous implementations of the invention are described in the subordinate claims.

An exemplary embodiment is explained in closer detail with reference to the drawings, other advantageous developed implementations of the invention and advantages thereof being described.

BRIEF DESCRIPTION OF THE DRAWING

In the Figs., like elements bear the same reference numerals.

DETAILED DESCRIPTION OF THE INVENTION

Figure 1:
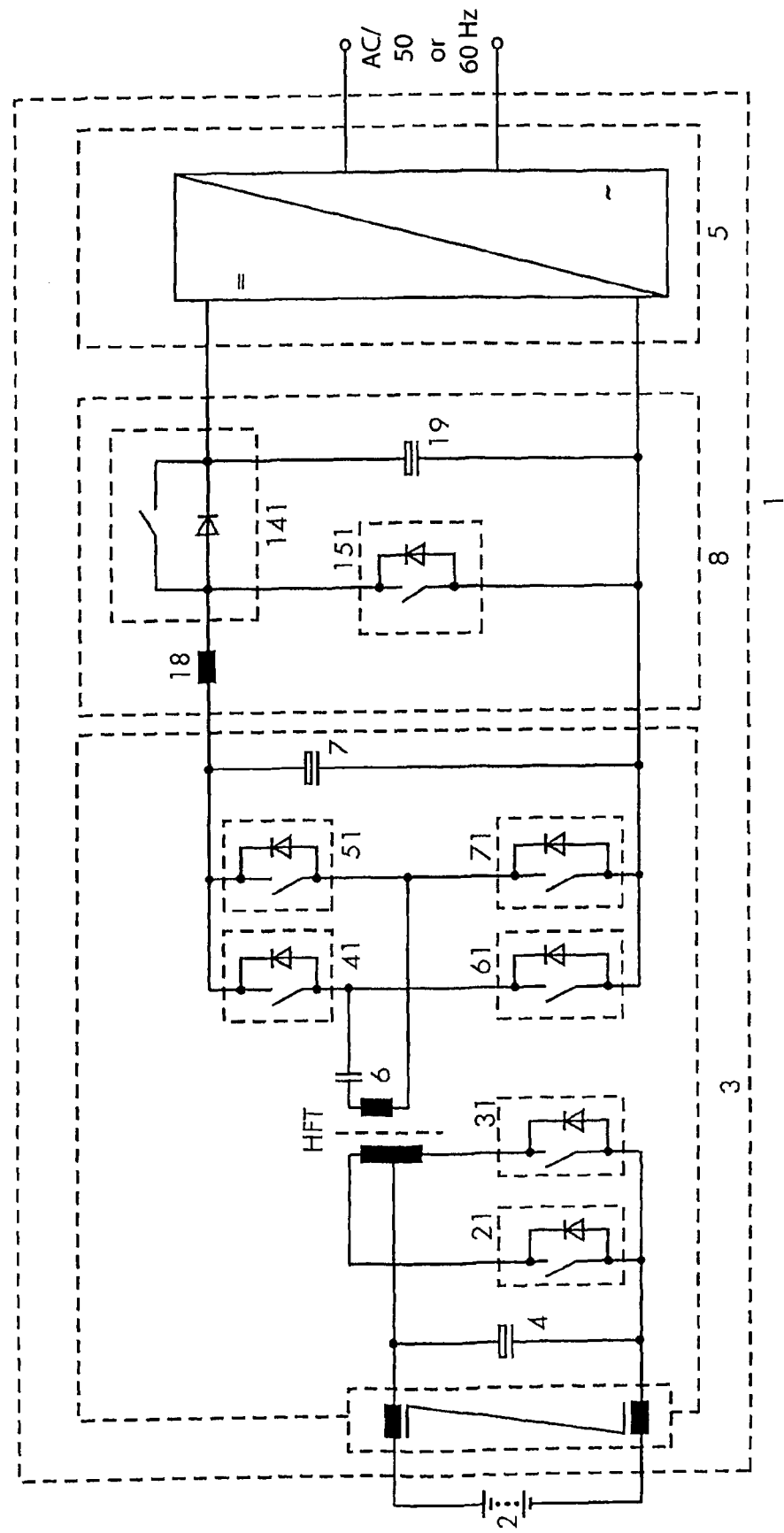
FIG. 1 shows a circuit diagram of a DC-DC converter of the invention.

FIG. 1 shows a power inverter 1 of the invention, for example for supplying AC consumers in island networks.

Said power inverter is connected to a battery 2. The power inverter 1 includes one DC-DC converter circuit element 3 with a capacitor 4 connected in parallel to the battery 2 and one HF transformer HFT.

The power inverter 1 further includes a DC-AC converter circuit element 5 that lies on the output side of the power inverter 1 and a boost-buck chopper 8 that is connected between the DC-DC converter circuit element 3 and the DC-AC converter circuit element 5. The DC-AC converter circuit element 5 is configured to be monophase.

The inverter 1 is configured to be a bidirectional battery power inverter and serves for generating an AC output voltage from the battery voltage in a discharge mode of operation and for charging the battery 2 in the charge mode. Together with a resonant capacitor 6, the HF transformer HFT forms a resonant circuit.

Figure 2:
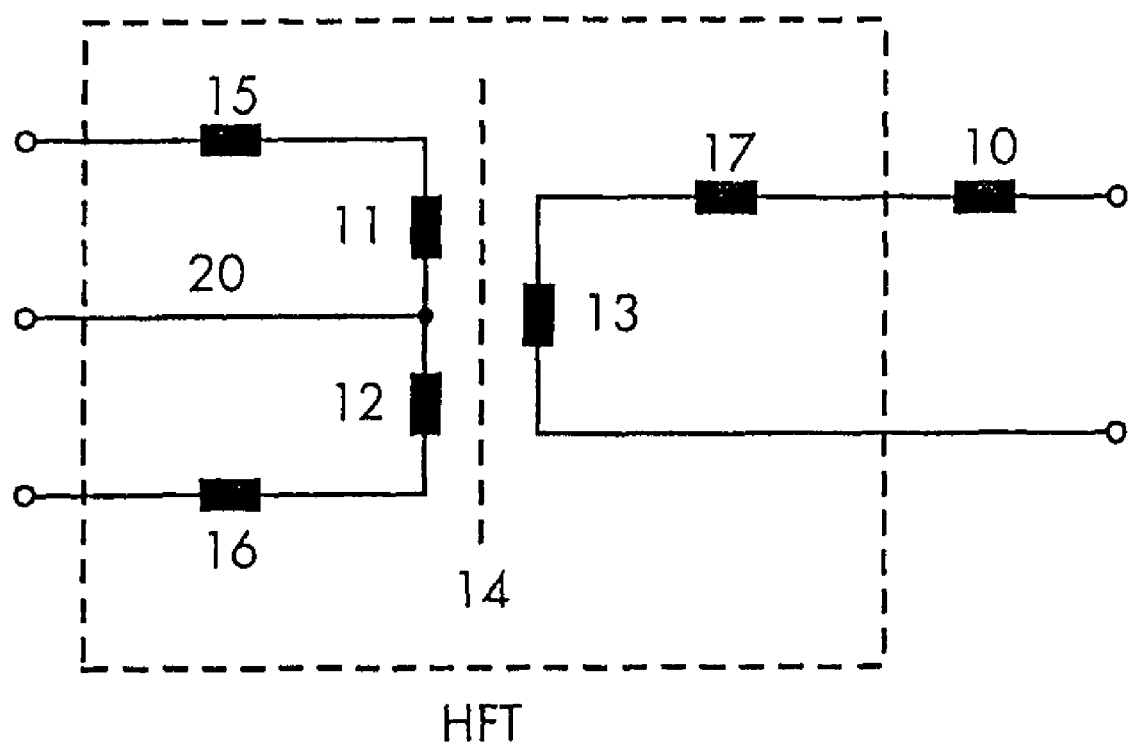
FIG. 2 shows an equivalent circuit diagram of the transformer HFT.

FIG. 2 shows an equivalent circuit diagram of the transformer HFT. In accordance with the invention, the transformer HFT has, on the primary side, two windings 11, 12 with a center tap 20, said center tap being connected to a power electronic midpoint circuit with semiconductor switches 21, 31, a winding 13 to which the resonant capacitor 6 is connected in series being provided on the secondary side. The semiconductor switches 21, 31 form a midpoint circuit.

FIG. 2 shows the leakage inductances 15, 16 on the primary side and the leakage inductance 17 on the secondary side. The core of the transformer bears the reference numeral 14. The center tap is indicated at 20. The reference numeral 10 designates an additional inductance.

The semiconductor switches 21, 31 switch alternately and generate the alternating voltage needed for voltage transformation, said alternating voltage being converted back into a direct voltage on the secondary side by the bridge-connected semiconductor elements 41, 51, 61, 71 and being smoothed by a filter capacitor 7. The DC-DC converter element works in a constant point of operation so that its input and output voltage are in a fixed relation dictated by the transformation ratio of the transformer.

Due to the resonant mode of operation, high switching frequencies of more than 50 kHz are appropriate so that a planar transformer may be utilized. It only makes sense to utilize planar transformers at frequencies in excess of 50 kHz.

Preferably, the resonant frequency of the alternating voltage circuit, which is composed of leakage inductances of the transformer HFT and a series resonant capacitance 6 (FIG. 1), is higher than the clock frequency of the semiconductor switch. As a result, the semiconductor switches 21, 31 can be switched both on and off with zero current.

There is provided the use of the boost-buck chopper 8 for allowing using the circuit for strongly fluctuating battery voltages. Thanks to the boost-buck chopper 8, the intermediate voltage is prevented from dropping to such an extent at small battery voltages that no output nominal voltage is achieved. If the pulse width in the DC-DC converter were reduced in the charging mode at low battery voltage, the resonant mode of operation could no longer be ensured. As a result, non-optimal operation would cause switch losses to occur. A boost-buck chopper 8 is utilized in particular, said boost-buck chopper adapting the variable battery voltage to a constant voltage at the capacitor 19. The boost-buck chopper 8 consists of a choke 18, the switch elements 141 and 151 and the capacitor 19. If the input voltage (battery voltage) exceeds e.g., 12 V, the voltage at the capacitor 19 increases proportionally with the input voltage. In this case, the boost-buck chopper needs no longer be clocked.

Figure 3:
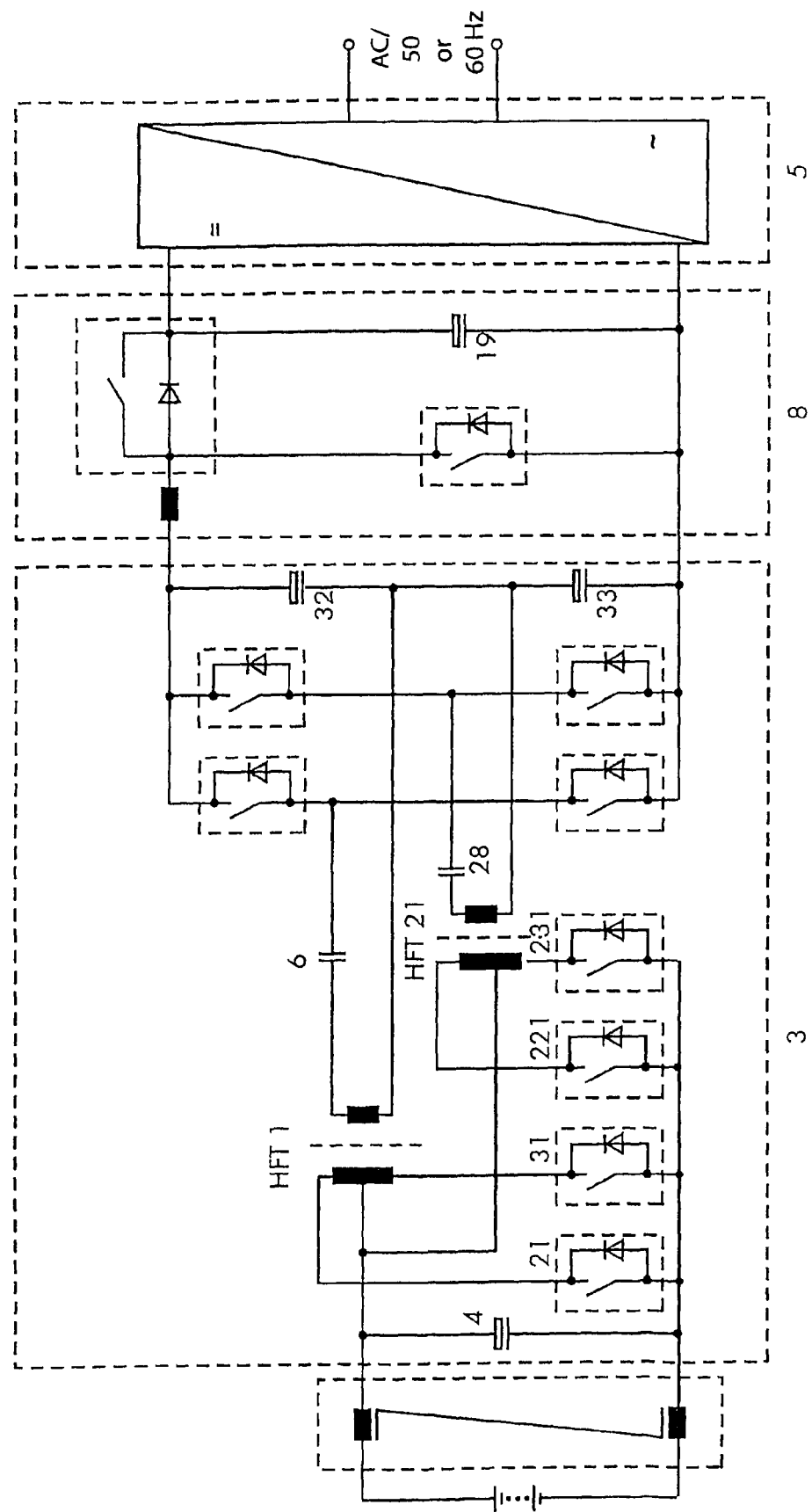
FIG. 3 shows a circuit diagram of a DC-DC converter of the invention with two HF transformers.

As shown in FIG. 3, the transformer circuit can be made from two circuit parts with two HF transformers HFT1 and HFT 21. The arrays are thereby provided with staggered clocking so that the capacitor load and the HF ripple current in the DC source are lower. The two circuit parts shown in FIG. 3 are configured to be half-bridge arrays. In a configuration with half-bridges, the transformation ratio of the transformer is only half as high. A smaller transformer transformation ratio is advantageous because then the leakage inductance 15 and 16 transformed from the overvoltage side by the transformation ratio will not become too high.

A half-bridge array needs less semiconductor switches and involves less cost as a result thereof.

Figure 4:
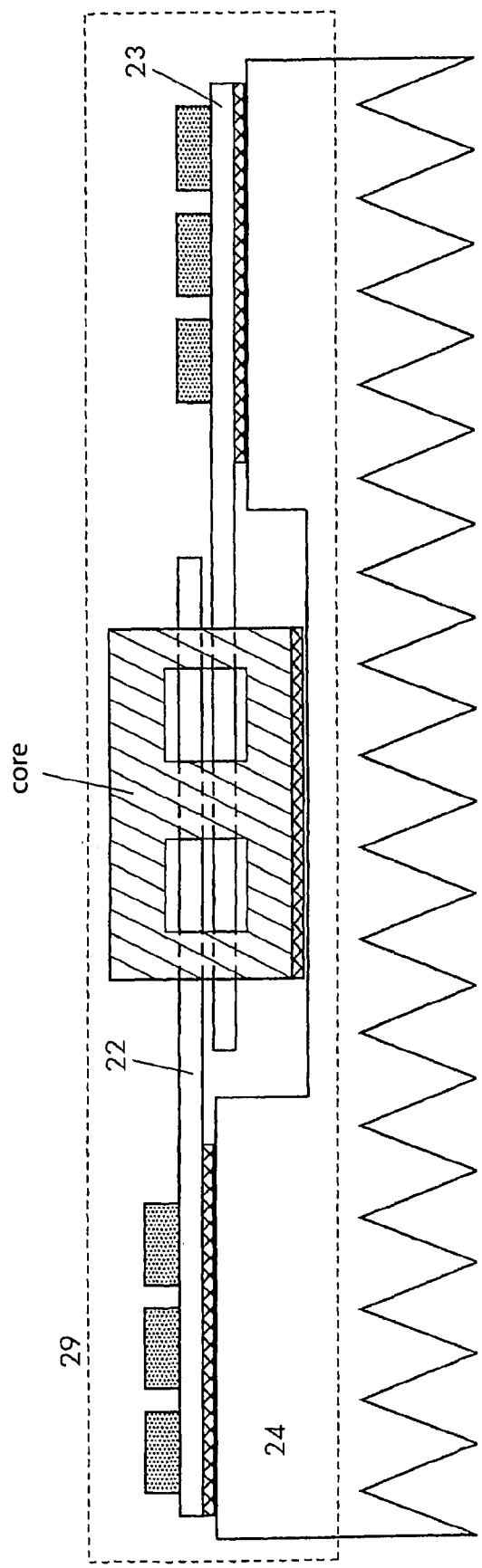
FIG. 4 shows a sectional view of a planar transformer and FIG. 5 shows another view of the planar transformer.
Figure 5:
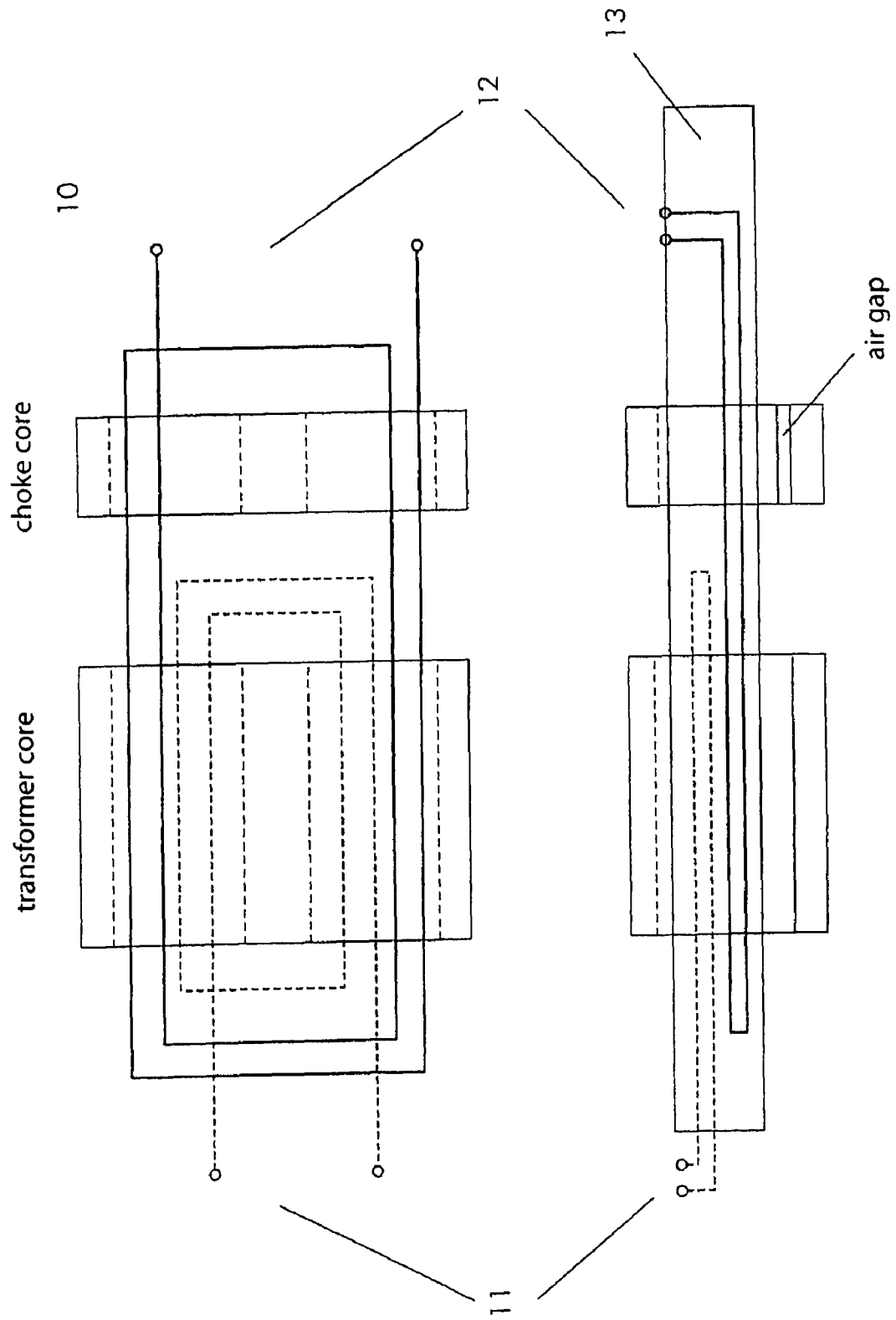

The planar transformer 29 shown in FIG. 4 is embedded in an aluminium cast housing 24 and comprises two printed circuit boards 22, 23. The power semiconductors can be configured to be built in SMD construction. As shown in FIG. 5, the transformer comprises a primary winding 26 and a secondary winding 27 that are arranged on a printed circuit board 25. The choke core 30 is provided with an air gap and is also integrated in the printed circuit board 25. It is only magnetized by the secondary winding 27, not by the primary winding 26.

Figure 6:
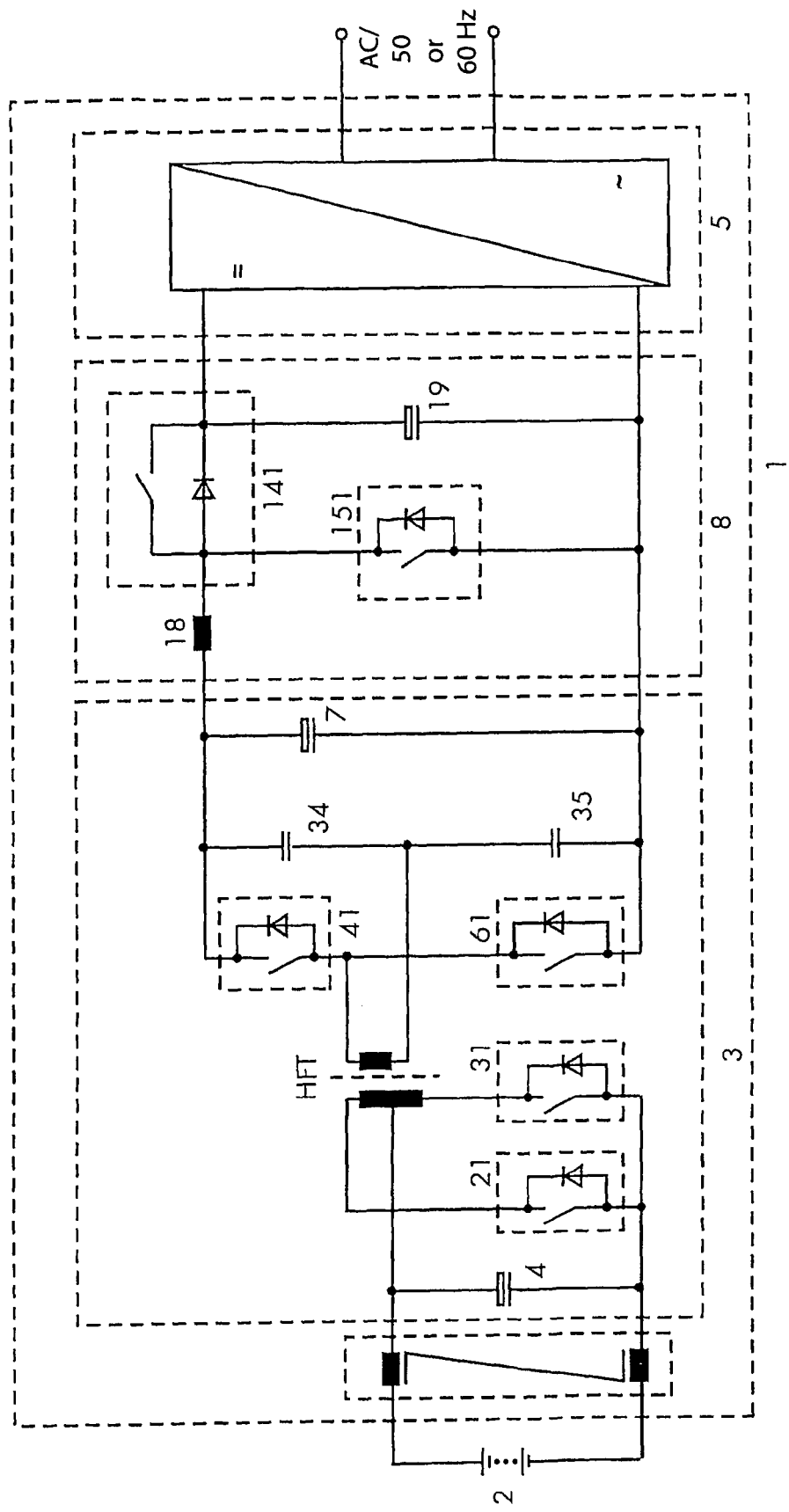
FIG. 6 shows a circuit diagram of a DC-DC converter of the invention with half-bridge capacitors as the resonant elements.
Figure 7:
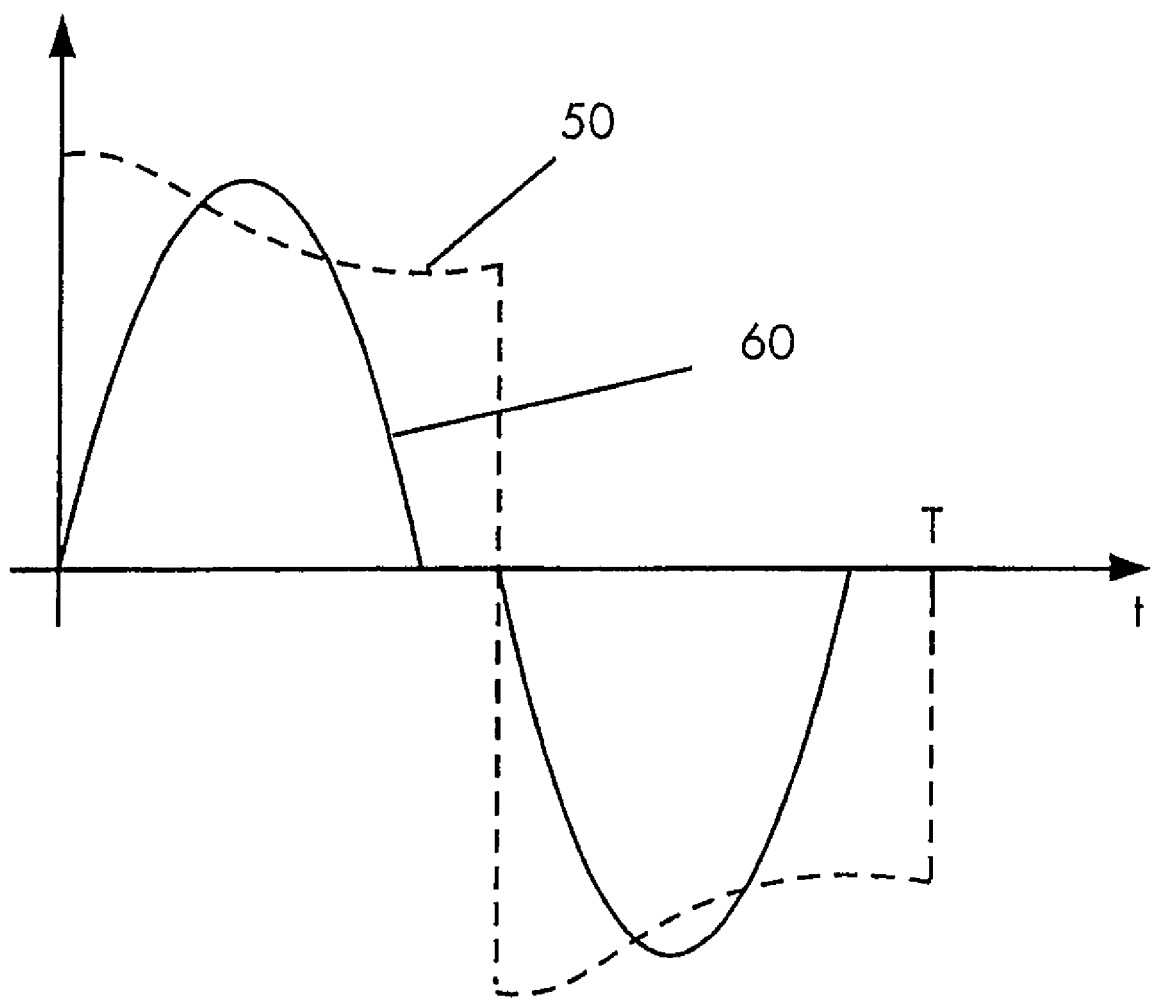
FIG. 7 shows transformer current and transformer voltage on the secondary side of the transformer.

In FIG. 6, there is shown a design of the circuit in which the capacitors 34, 35 form a resonant circuit together with the leakage inductance of HFT. With such a design, the parasite capacitors of the semiconductor switches 21, 31 are discharged to particularly low values by the currents in the main inductance of the transformer prior to switching them on. Smaller switch-on losses occur as a result thereof. The transformer currents and the voltages occurring on the secondary side in this implementation correspond to the illustration shown in FIG. 7. FIG. 7 shows the current 60 and the voltage 50 on the secondary side of the transformer.

The DC-AC converter 5 can be configured to be a H-bridge for converting a one-phase AC voltage or a three-phase bridge for converting a three-phase AC voltage.

An arrangement in which the DC-AC converter 5 is always operated in such a manner that the voltage at the capacitor 19 is always higher than the peak value of the nominal voltage may also be advantageous. As a result, in case the battery is being charged, the DC-AC converter can be operated in a PFC (Power Factor Correction) mode of operation and sinusoidal current in phase with the mains voltage can be tapped from the mains. In case the battery is being discharged, a sinusoidal AC voltage can be generated at any form of current.

In order to be capable of supplying any load (including asymmetric load and unipolar loads) in the case of three-phase converters, a connected N can be added as the fourth phase and the entire circuit can be implemented so that the capacitor 19 consists of two capacitors with a grounded midpoint, each capacitor being charged or discharged separately by a resonant converter having a boost-buck chopper connected downstream thereof.

The semiconductors 21, 31, 41, 51, 61, 71, 141, 151 may be configured to be MOSFETs, IGBTs, bipolar transistors or GTOs. The parallel diodes can be separate components or consist of parasite diodes of the MOSFETs utilized. The DC source 2 can be a battery, a fuel cell, a generator-supplied DC intermediate circuit or a double-layer capacitor (Ultracap).

The resonant converter can be advantageously utilized in automobiles in order to allow for energy exchange between different DC sources such as traction battery, double-layer capacitor, auxiliary operating battery and so on. The direction of the energy flow may thereby be reversed while accelerating and braking.

The planar transformer may be advantageously implemented in such a manner that the secondary leakage inductance is increased by integrating an additional choke into the secondary transformer winding. This may occur in the manner shown in FIG. 5.

As contrasted with the half- and full bridge circuits, the semiconductor voltages of the semiconductors 21, 31, 221 and 231 are not limited to the capacitor voltage of the capacitor 4. As contrasted with normal midpoint circuits, the capacitor voltage is not limited to the double of the capacitor voltage of capacitor 4; the voltage drop above the primary side portion of the resonant inductance of the transformers HFT 1 and HFT 21 is added thereto. This effect can only be controlled if the substantial portion of the resonant inductance is displaced for its major part onto the secondary side. This is achieved by the transformer structure described and/or by additional resonant inductances 10 on the secondary side.

LIST OF NUMERALS

1 power inverter
2 battery
3 DC-DC converter circuit element
4 capacitor
5 DC-AC converter circuit element
6 resonant capacitor
7 filter capacitor
8 boost-buck chopper
10 additional leakage inductance
11, 12 primary side windings
13 secondary side winding
14 transformer core
15, 16 primary side leakage inductances
17 leakage inductance
18 choke
19 capacitor
20 center tap
21 semiconductor switch
22, 23 printed circuit board
24 aluminium cast housing
25 printed circuit board
26 primary winding
27 secondary winding
28 resonant capacitor
29 planar transformer
30 choke core
31 semiconductor switch
32, 33 half-bridge capacitors
34, 35 half-bridge capacitors as resonant elements
41, 51, 61, 71 semiconductor elements
50 secondary side transformer voltage
60 secondary side transformer current
141, 151 semiconductor switch
HFT HF transformer
HFT 1, HFT 21 HF transformer
LSP air gap
221, 231 switch element

I claim:

1. A bidirectional battery power inverter with a DC-DC converter circuit element, to which a battery may be connected, for generating an AC output voltage from a battery voltage of the battery in a discharge mode of operation and for charging the battery in a charge mode of operation, said power inverter including an HF transformer that forms a resonant circuit together with a resonant capacitor,
characterized in
that the transformer comprises two windings with a center tap on its primary side, said center tap being connected to a power electronic midpoint circuit with semiconductor switches, a winding to which the resonant capacitor is connected in series being provided on the secondary side,
that a DC-AC converter circuit element is provided which lies on the output side of the power inverter and comprises a boost or buck chopper that is connected between the DC-DC converter circuit element and the DC-AC converter circuit element and
that a resonant switching element is distributed in circuit parts having a staggered clock rate,
the resonant frequency of the alternating voltage circuit being higher than the clock frequency of a half-bridge.

2. The bidirectional battery power inverter as set forth in claim 1 characterized in that the DC-DC converter circuit element comprises a half-bridge.

3. The bidirectional battery power inverter as set forth in claim 1 characterized in that the transformer is configured to be a planar transformer.

4. The bidirectional battery power inverter as set forth in claim 1, characterized in that the primary windings of the transformer are only guided about the transformer core while the secondary winding is guided about the transformer core and about an additional choke core.

5. A bidirectional battery power inverter with a DC-DC converter circuit element, to which a battery may be connected, for generating an AC output voltage from a battery voltage of the battery in a discharge mode of operation and for charging the battery in a charge mode of operation, said power inverter including an HF transformer that forms a resonant circuit together with resonant capacitors,
characterized in
that the transformer comprises two windings with a center tap on its primary side, said center tap being connected to a power electronic midpoint circuit with semiconductor switches, and one winding on the secondary side, said winding being connected to the resonant capacitors at a convergence point,
that a DC-AC converter circuit element is provided which lies on the output side of the power inverter and comprises a boost or buck chopper that is connected between the DC-DC converter circuit element and the DC-AC converter circuit element and
that a resonant switching element is distributed in circuit parts having a staggered clock rate.

6. The bidirectional battery power inverter as set forth in claim 5, characterized in that the DC-DC converter circuit element comprises a half-bridge.

7. The bidirectional battery power inverter as set forth in claim 5, characterized in that the transformer is configured to be a planar transformer.

8. The bidirectional battery power inverter as set forth in claim 5, characterized in that the primary windings of the transformer are only guided about the transformer core while the secondary winding is guided about the transformer core and about an additional choke core.

9. A bidirectional battery power inverter for bidirectionally converting electrical power between a DC side and an AC side of the inverter, the DC side being connectable to a battery the inverter comprising:
a power electronic midpoint circuit coupled to a primary winding of an HF transformer,
and bridge-connected semiconductor elements coupled to a secondary winding of the HF transformer through capacitance, wherein the capacitance in conjunction with a leakage inductance of the HF transformer defines a resonant frequency, a DC/AC converter connected to the DC/DC converter, the DC/AC converter comprising a boost-buck chopper for avoiding voltage-dropping, so that an output nominal voltage is achieved, wherein the power electric midpoint circuit is configured to be operated at an operation frequency lower than the resonant frequency in order to allow for a substantially zero current switching of the power electronic midpoint circuit 10. The bidirectional battery power inverter of claim 9, wherein the primary winding comprises a center tap being connected to a first battery terminal, and wherein the power electronic midpoint circuit comprises two switches being connected to a second battery terminal.

11. The bidirectional battery power inverter of claim 9, wherein the capacitance comprises two capacitors connected in series between connection terminals, and wherein the secondary winding is connected to a midpoint of the two capacitors.

12. The bidirectional battery power inverter of claim 9, wherein the DC/DC converter further comprises a second power electronic midpoint circuit coupled to a primary winding of a second HF transformer, and second bridge-connected semiconductor elements coupled to a secondary winding of the second HF transformer through a second capacitance.

13. The bidirectional battery power inverter of claim 12, wherein the power electronic midpoint circuit and the second power electronic midpoint circuit are configured to be operated at the same operation frequency by an offset clocking.

14. The bidirectional battery power inverter of claim 9, wherein the bridge-connected semiconductor elements are configured to form a half bridge.

15. The bidirectional battery power inverter of claim 9, wherein the bridge-connected semiconductor elements are configured to form a full bridge.

16. The bidirectional battery power inverter of claim 9, wherein the HF transformer is a planar transformer.

17. The bidirectional battery power inverter of claim 9, wherein the primary winding of the HF transformer is only guided about a transformer core, and the secondary winding of the HF transformer is guided about an additional choke core.

18. A bidirectional battery power inverter for bidirectionally converting electrical power between a DC side and an AC side of the inverter, the DC side being connectable to a battery, the inverter comprising:

a DC/DC converter comprising a first and a second power electronic midpoint circuit coupled to corresponding primary windings of a first and second HF transformer, the DC/DC converter further comprising first and second bridge-connected semiconductor elements coupled to corresponding secondary windings of the first and second HF transformer through corresponding coupling capacitances defining a resonant frequency in conjunction with a leakage inductance of the HF transformer a DC/AC converter connected to the DC/DC converter, the DC/AC converter comprising a boost-buck chopper for avoiding voltage-fluctuation, so that an output nominal voltage is achieved wherein the power electronic midpoint circuit is configured to be operated at an operation frequency lower than the resonant frequency in order to allow for a substantially zero current switching of the power electronic midpoint circuit achieved, and wherein the coupling capacitances are each formed by two capacitors connected in series, one tap of the secondary windings of each of the first and second HF transformer being connected to midpoints of the corresponding capacitance.

* * * * *

UNITED STATES PATENT AND TRADEMARK OFFICE
CERTIFICATE OF CORRECTION

| | | |
|---|---|---|
| PATENT NO. | : 7,746,669 B2 | Page 1 of 1 |
| APPLICATION NO. | : 11/977115 | |
| DATED | : June 29, 2010 | |
| INVENTOR(S) | : Andreas Falk | |

It is certified that error appears in the above-identified patent and that said Letters Patent is hereby corrected as shown below:

On the Cover Page, Item (73) Please correct the Assignee's name from "SMP Solar Technology AG" to --SMA Solar Technology AG--

Signed and Sealed this

Seventeenth Day of May, 2011

David J. Kappos
*Director of the United States Patent and Trademark Office*